UNITED STATES PATENT OFFICE.

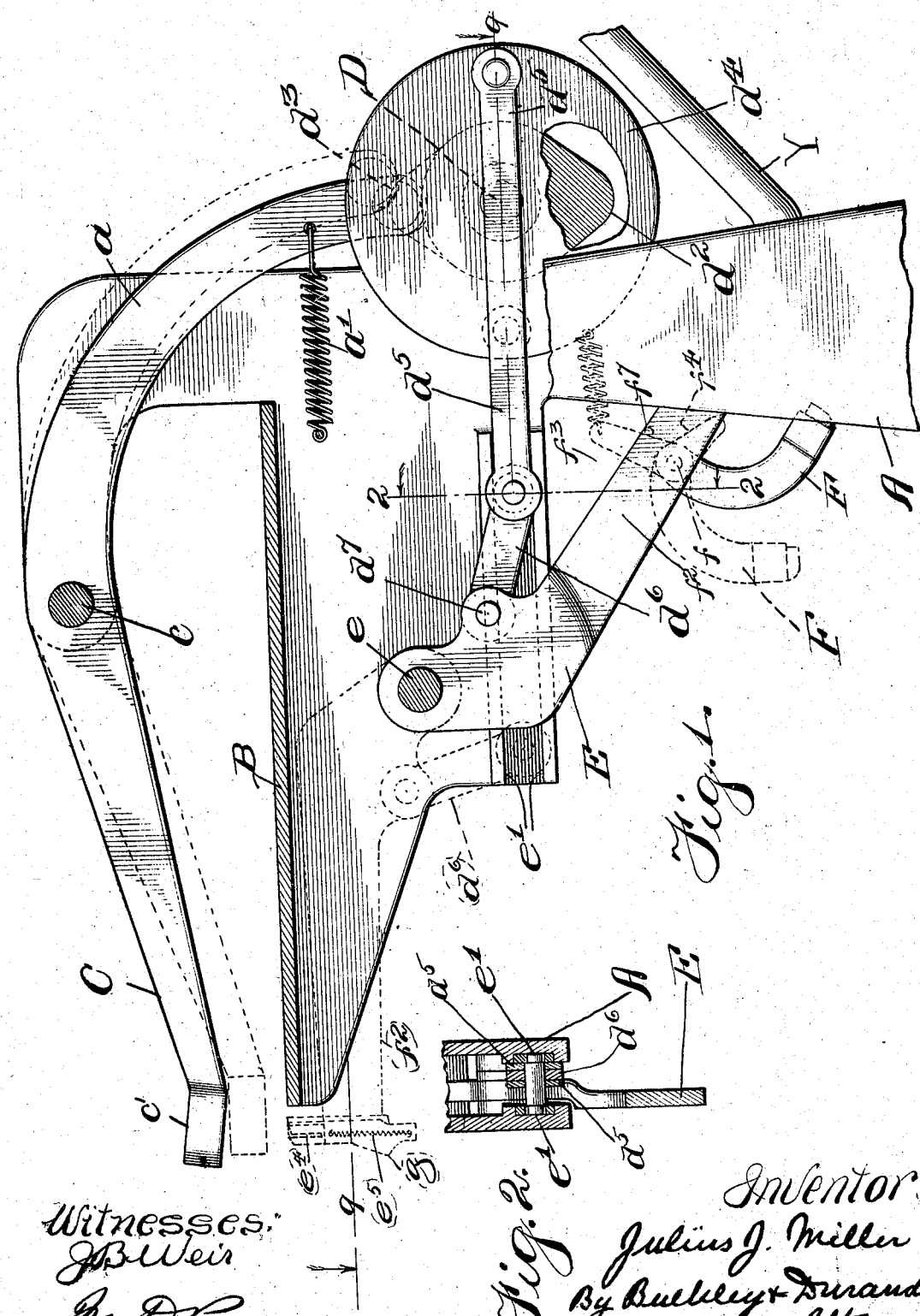

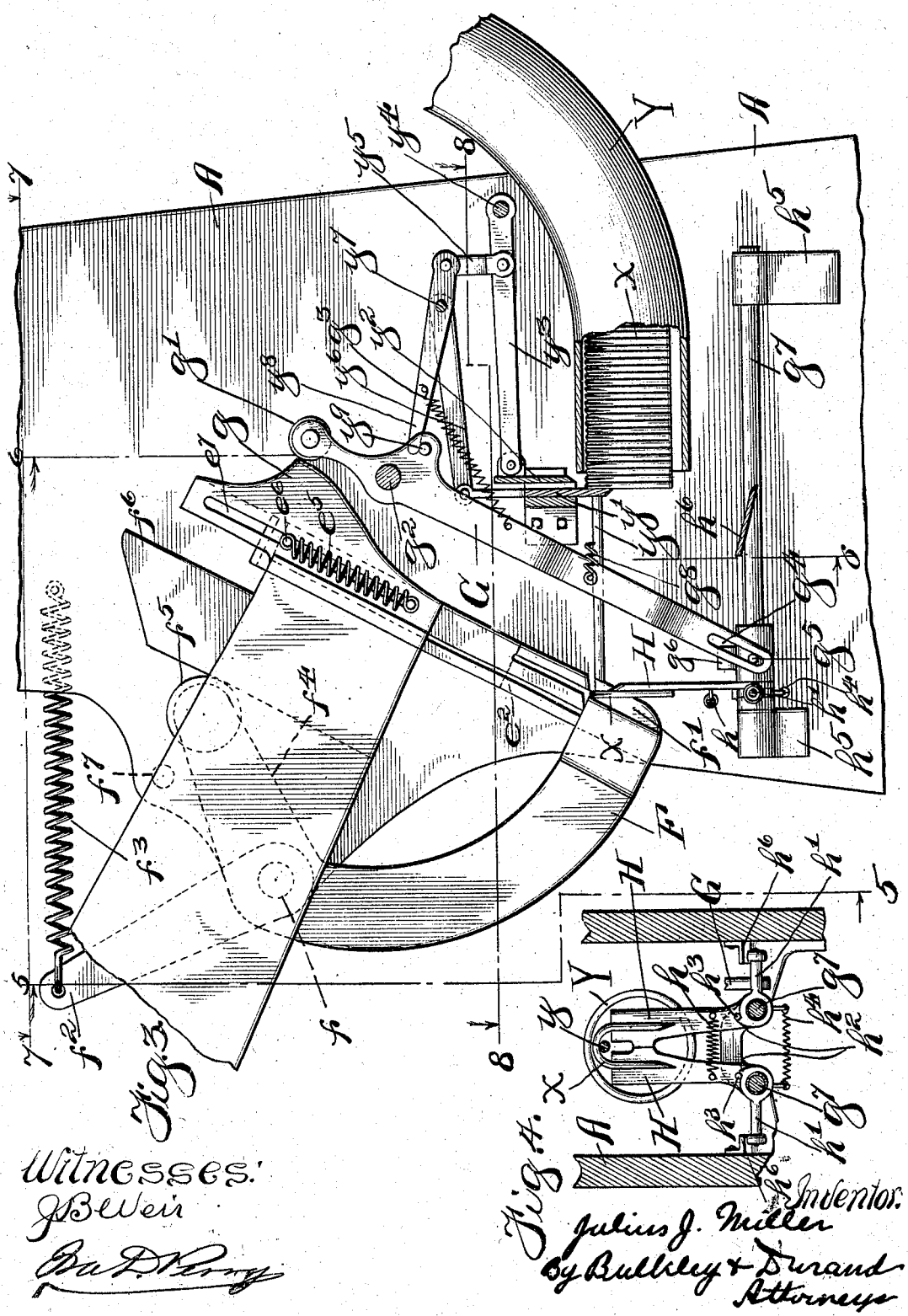

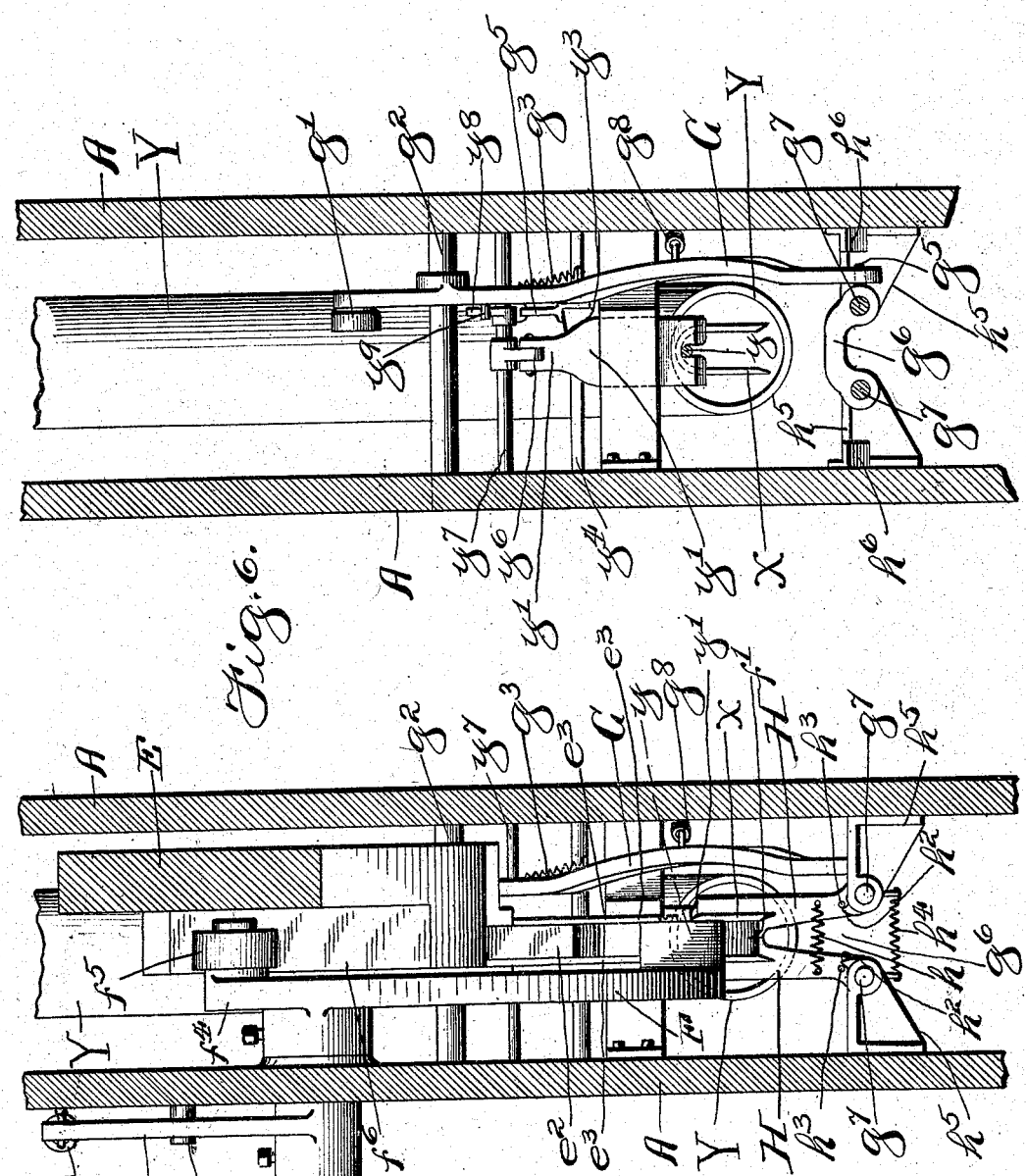

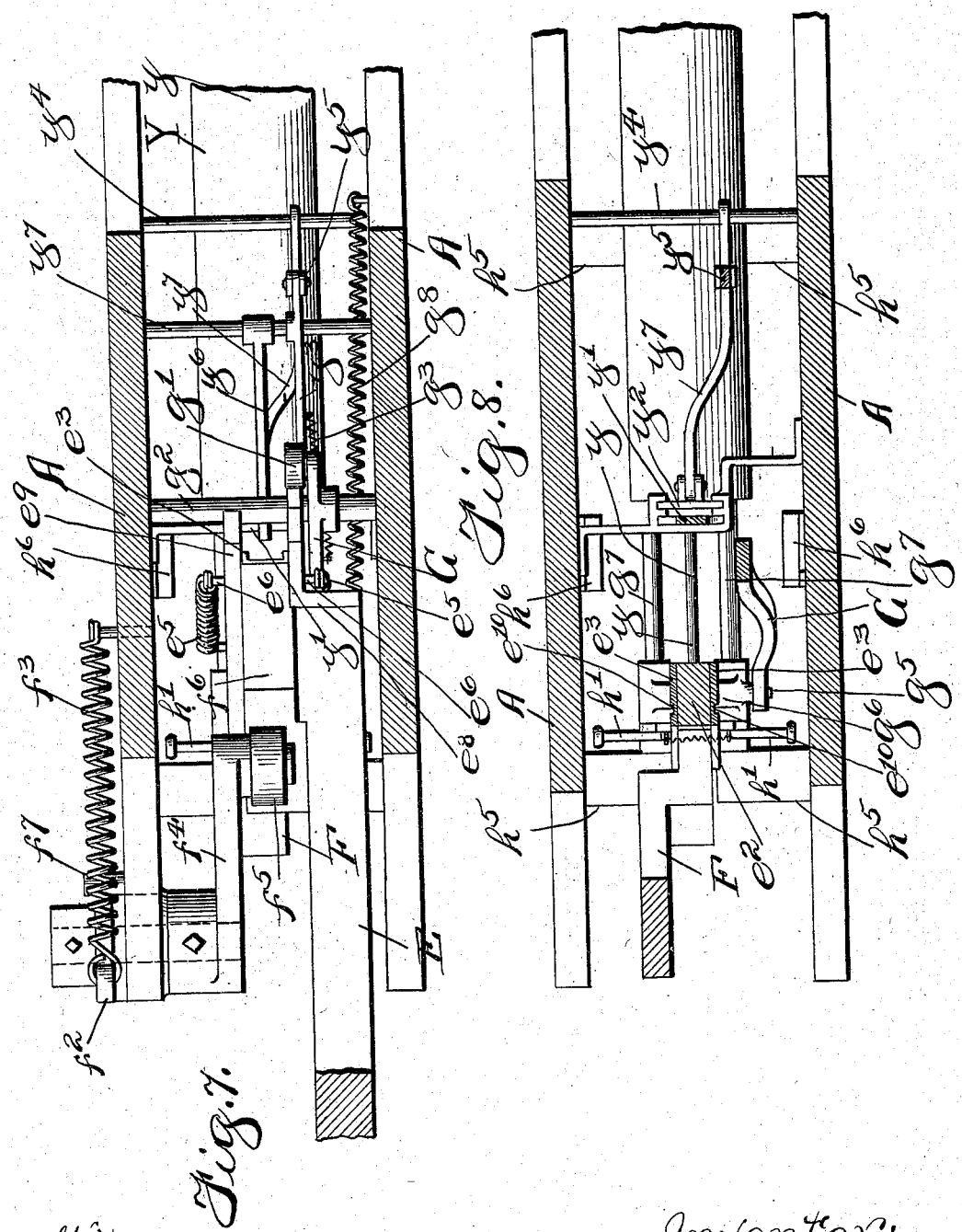

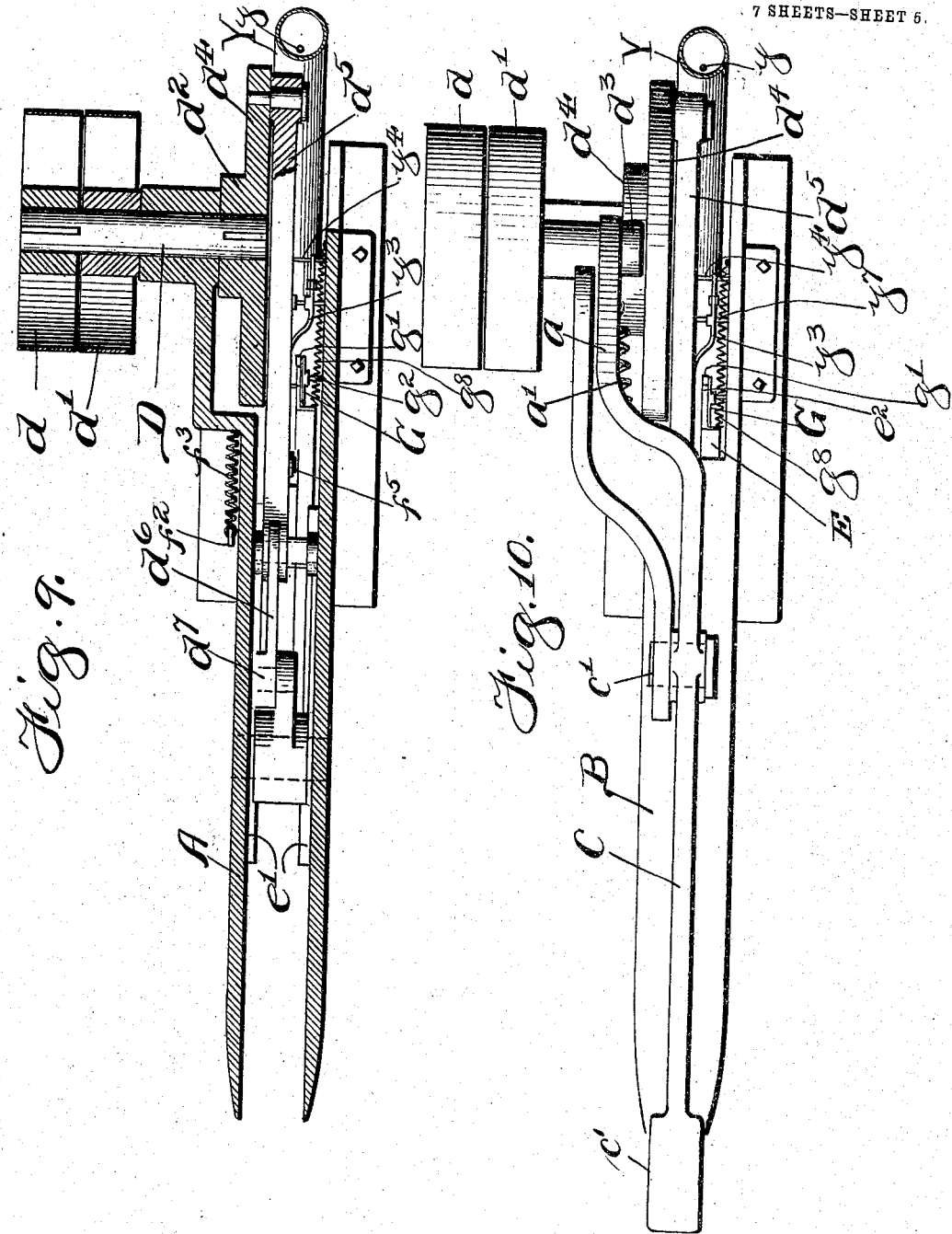

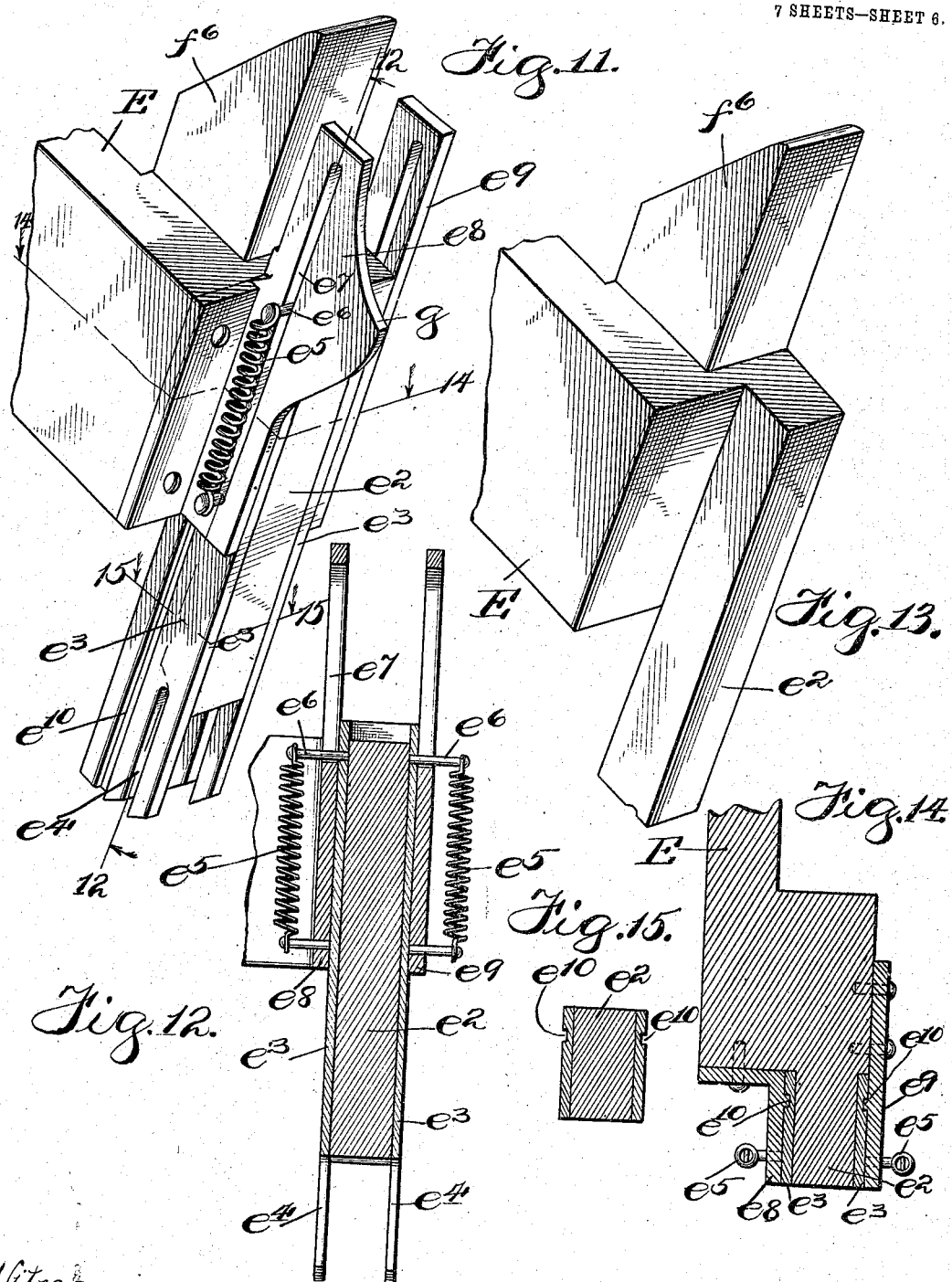

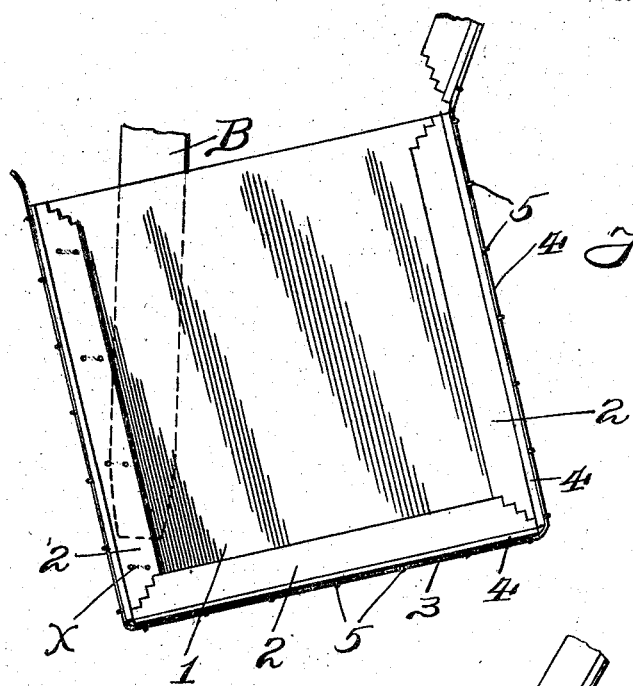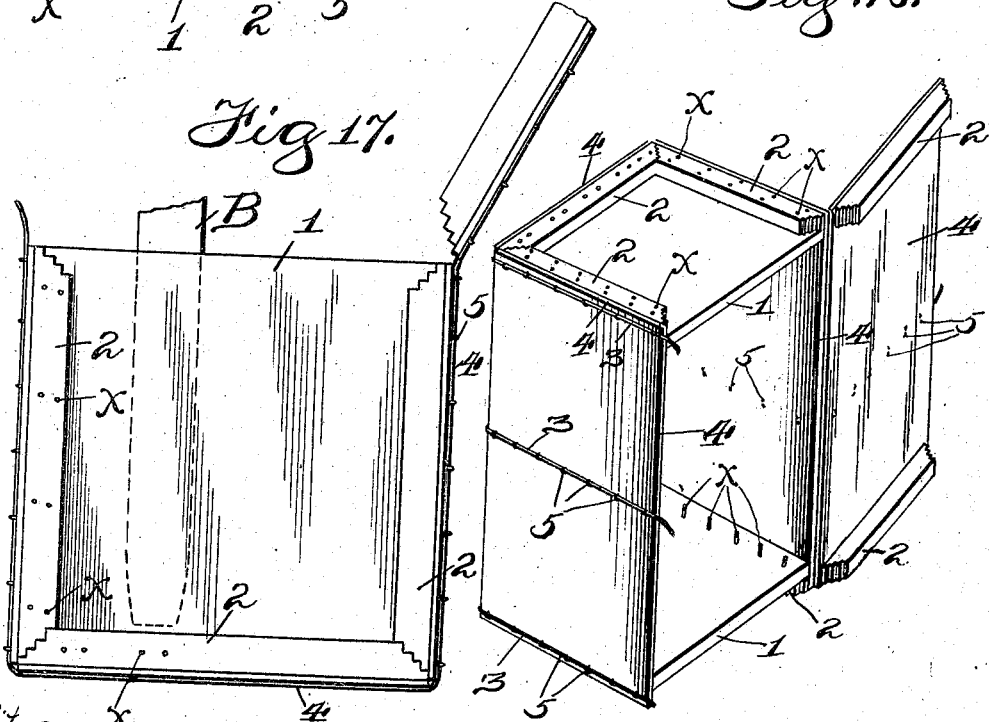

JULIUS J. MILLER, OF ST. JOSEPH, MICHIGAN, ASSIGNOR TO WILLIAM P. HEALY, OF CHICAGO, ILLINOIS.

MACHINE FOR USE IN MAKING WIRE-BOUND BOXES.

No. 840,703.  Specification of Letters Patent.  Patented Jan. 8, 1907.

Application filed June 10, 1905. Serial No. 264,546.

*To all whom it may concern:*

Be it known that I, JULIUS J. MILLER, a citizen of the United States of America, and a resident of St. Joseph, Michigan, have invented a certain new and useful Improvement in Machines for Use in Making Wire-Bound Boxes, of which the following is a specification.

My invention relates to machinery for use in making wire-bound packing-boxes.

In the manufacture of boxes or metal-bound packages of this character it is the general practice to first construct a wire-bound blank adapted to constitute the side walls of the box or package and to then wrap the same around the square or rectangular boards constituting the heads or ends walls of the box and to then secure the blank and heads or end walls together by driving staples or other fastening devices through the reinforcing-cleats of the blank and into the said heads or end walls. Usually the said cleats comprising part of the blank are much thicker than the said heads or end walls, so that it is necessary to drive the staples or other fastening devices through the relatively thick cleats and then through the relatively thin heads or end walls and to then clench the said staples or fastening devices upon the inner surfaces of the said heads or end walls. Consequently and as is obvious the staples or fastening devices must be of considerable length, and as another objection or disadvantage they are driven first through the thick material and then through the thin material. In other words, this practice not only necessitates the use of more wire or other material in fastening the parts of the box together, but is also likely to result more or less in the production of imperfect boxes.

Generally stated, the object of my invention is therefore the provision of a machine for driving staples or other devices through the said heads or end walls and into the said cleats rather than through the cleats and into the heads or end walls, and for thus bringing the heads of the staples or other fastening devices against the inner surface of the thinner material and causing the points of the staples or other fastening devices to become embedded in the cleats or thicker material, whereby it is not only possible to use less wire for staples or other fastening devices, but also possible to insure a stronger and more perfect box or package.

Special objects of my invention are to provide an improved construction and arrangement whereby the unfinished wire-bound box or package can be supported in the usual manner upon an arm or rest while the staples or other fastening devices are being inserted for the purpose of securing the heads or end walls to the cleats of the blank, but whereby said staples or fastening devices are driven upwardly through the relatively thin head or end wall and then into the cleats, or relatively thick material, rather than downwardly through the cleats and into the said heads or end walls, which latter has invariably been the practice; to provide an improved construction and arrangement whereby a driving device can be so operated as to pick up a ready-made or other fastening device and then move around and insert the same upwardly through the head or end wall and into one of the cleats of the blank; to provide an improved construction and arrangement whereby the said heads or end walls can be firmly clamped between the arm or rest and an upper foot or clamping-arm during the time that the staples or other fastening devices are being driven or inserted upwardly through the said heads or end walls and into the cleats of the blank constituting the side walls of the box, and to provide certain details and features of improvement tending to increase the general efficiency and serviceability of a machine of this particular character.

To the foregoing and other useful ends my invention consists in matters hereinafter set forth and claimed.

In the accompanying drawings, Figure 1 is a side elevation, partly in vertical section, of the upper portion of a machine embodying the principles of my invention. Fig. 2 is a detail vertical section on line 2 2 in Fig. 1. Fig. 3 is an enlarged side elevation, partly in section, of the staple-feeding portion of the mechanism, showing the staple-driver arm swung back in position to pick up a staple. Fig. 4 is a detail sectional view showing the front of the mechanism shown at the bottom of Fig. 3. Fig. 5 is a detail vertical section on line 5 5 in Fig. 3. Fig. 6 is a detail sectional view on line 6 6 in Fig. 3. Fig. 7 is a horizontal section on line 7 7 in Fig. 3. Fig.

8 is a horizontal section on line 8 8 in Fig. 3. Fig. 9 is a horizontal section on line 9 9 in Fig. 1. Fig. 10 is a plan view of the machine shown in Fig. 1. Fig. 11 is a detail perspective view of the staple-driving devices. Fig. 12 is a detail section on line 12 12 in Fig. 11. Fig. 13 is an enlarged detail perspective of the staple-driver, showing the cam and end of the staple-driver arm, which are rigid with the said driver. Fig. 14 is a detail section on line 14 14 in Fig. 11. Fig. 15 is a detail section on line 15 15 in Fig. 11. Figs. 16 and 17 illustrate the manner in which a box is manipulated during the operation of securing the heads or end walls thereof to the cleats of the blank. Fig. 18 is a perspective of a completed box.

As thus illustrated, and referring to Fig. 1, it will be seen that the said machine comprises a suitable pedestal or upright A, adapted to support the various operative parts in suitably-elevated positions. At its upper end the said pedestal or standard is provided with a laterally-projecting and horizontally-disposed arm B, the same being adapted to serve as a rest or support for the box while the staples are being driven through the cleats and into the heads or end walls. During such operation the head or end wall of the box rests flatwise upon the rest B, as shown in Figs. 16 and 17, and each time a staple is driven upwardly through the materials the swinging foot or clamping-arm C swings down and bears upon the said head or end wall, so as to hold the latter firmly upon the horizontal upper surface or top of the rest B.

As will hereinafter more fully appear, the operative parts are all driven or operated from a shaft D, mounted in suitable bearings on the pedestal or standard A. As shown, the said shaft is provided with fast and loose pulleys $d$ and $d'$, whereby the belt can be shifted from one to the other in the usual well-known manner and the machine thereby operated or allowed to remain at rest. Said shaft is provided with a cam $d^2$, adapted to engage an end portion $d^3$ of the clamping-arm C, which latter is pivotally mounted at $c$ upon an arm or rigid portion $a$ of the said pedestal or standard A. It will also be seen that the staple-driver arm E, which is pivotally mounted at $e$, is operated from the shaft D through the medium of a crank-plate $d^4$, mounted thereon, and pitman $d^5$ and a link $d^6$, pivotally connected at $d^7$ with the said arm E.

It will be seen that the point of pivotal connection between the pitman $d^5$ and the link $d^6$ serves as a cross-head, which is adapted to slide or reciprocate horizontally in the ways or guide-channels $e'$. The arm C is subject at all times to the tension of the spring $a'$, whereby the cam $d^2$ is operated to cause the end portion $c'$ of the arm to move downwardly, but whereby said arm is immediately retracted to its normal position as soon as the cam rotates to a different position.

As stated, the box is adapted to be placed upon the end of the rest B with the head or end wall 1 just inside of the cleats 2, as shown in Figs. 16 and 17, both the said fastener-driver and the said rest or guiding means being adapted to reach into or enter the box. The formation of the said rest B is such that one side of the box can first be caused to slide along upon one corner of the rest, so as to drive a row of staples through a cleat at this side of the box. Then the bottom wall of the box can be caused to slide across upon the end of the rest, as shown in Fig. 17, so as to secure the head or end wall to the cleat, which constitutes a part of the bottom section of the blank. After this the other side of the box is secured to the heads or end walls in a manner similar to the operation shown in Fig. 16. In each case the staple or other fastening device is driven upwardly through the head 1 and into one of the cleats 2, it being understood that at this time the sections of the blank are all held together by the binding-wires 3, which latter are secured to the cleats and the veneering 4 by means of staples 5. In this way each staple or fastening device is first driven upwardly through the relatively thin material—to wit, the head or end wall 1—and thence upwardly and into the relatively thick material—to wit, one of the cleats 2. Consequently the fastening together of the parts is much more effective than would be the case were the staples first driven through the cleats and then into the said heads or end walls. In other words, I staple or nail or otherwise secure the thin material to the thick material rather than follow the old practice of securing thick material to thin material, and as the cleats are usually of considerable thickness and often of harder wood than the balance of the material it is obvious that the staples can be driven upwardly and firmly lodged in place without being clenched at their ends—that is, the staples need not necessarily be of a length to extend entirely through the cleats.

The fastening devices can of course be staples, nails, tacks, or any other suitable devices; but as shown and described my improved machine includes mechanism for driving fastening devices of that specific character known as "staples." For this purpose the end of the staple-driver arm E is provided with a staple-driver $e^2$, which is rigidly secured to the said staple-driver arm. The end of this arm is also provided with a relatively movable or sliding staple-guide $e^3$, having slotted or grooved prongs $e^4$ arranged at each side of the said staple-driver, as shown more clearly in Figs. 11 and 12. This staple-guide or "pick-up," as it may be called, inasmuch as it picks up the staples to be driven, is connected with said arm E by means of springs $e^5$. As shown, these springs are connected with pins $e^6$, secured to the staple-guide and adapted to slide in slots $e^7$, formed in the plates $e^8$ and $e^9$, which latter are rigid with the arm E. Thus it will be seen that the staple-guide is adapted to pick up a staple and carry it around until both the points of the staple and also the end portions of the staple-guide may contact with the under surface of the head or end wall of the box. After this the further movement of the arm E does not produce any movement of the staple-guide, owing to the elastic or yielding connection between the arm and the guide provided by the springs $e^5$, but during this final movement for the purpose of driving the staples upwardly through the materials it is evident that the staple-driver $e^2$ moves with the arm E—that is, any movement communicated to the arm E is always communicated to the staple-driver $e^2$, which latter, however, can move relatively to the staple-guide $e^3$, and thus produce the driving of the staple after the guide has made contact with the under surface of the head or end wall and has stopped moving. In order to enable it to slide properly upon the end of the arm E, the said staple-guide $e^3$ is preferably provided with longitudinal grooves $e^{10}$, engaged by suitable portions carried by the plates $e^8$ and $e^9$. It will also be seen that the outer ends of the slots or grooves $e^4$ are preferably somewhat widened, so as to enable these slotted grooves more readily and easily to engage and pick up the staples. The arrangement for supplying or feeding the staples to the said staple-driving device consists, preferably, of a loop-bar F, pivotally mounted at $f$ upon the frame or body of the machine and provided with an end portion $f'$, adapted to receive the staples X, as shown more clearly in Fig. 3. At its upper end the loop-bar F is provided with an arm $f^2$, which is subject to the tension of the spring $f^3$, and with another arm $f^4$, provided with a roll $f^5$. At this juncture it will be seen that the end of the arm E is provided with a rigid cam portion $f^6$, adapted to engage the roll $f^3$ when the arm E is swung back to the position shown in Figs. 1 and 3, or to the position necessary to enable the staple-driving device to pick up a staple. Normally the loop-bar F occupies the position shown in dotted lines in Fig. 1. When the staple-driving device swings down to receive a staple, then the cam portion $f^6$ strikes the roll $f^5$ and brings the loop-bar to the position shown in Fig. 3 or to the position shown in full lines in Fig. 1. The staples X, which can be held in any suitable manner, are fed downwardly and forwardly through a tube or conducting device Y and are adapted to be fed one by one upon the rod or delivering device $y$, which latter may extend into the tube Y for any suitable or desired distance. These staples are admitted to the said rod $y$ by the alternate opening and closing movements of the valves or cut-off devices $y'$ and $y^2$, the former being always down when the latter is up, and vice versa, according to the condition of the different parts. It will be seen, however, that these valves or cut-off devices have sharp lower edges, whereby when the valve or cut-off $y'$ rises the sharp edge of the valve or cut-off $y^2$ then wedges in between the outermost two staples, so as to crowd one staple outside of the vertical plane or path of the valve or cut-off $y'$. These valves or cut-offs are operated by a lever arrangement substantially as shown in Fig. 3. As an example of effective construction the said lever arrangement comprises a lever $y^3$, pivoted at $y^4$ and connected at its other end with the valve or cut-off device $y^2$. Intermediate of its ends the lever $y^3$ is connected by a link $y^5$ with the shorter end portion of another lever $y^6$, the latter being pivotally mounted at $y^7$. This last-mentioned lever has its longer end suitably connected with the upper end of the valve or cut-off $y'$. In addition the lever $y^6$ is rigid with a finger $y^8$, adapted to be engaged by a pin $y^9$, carried by a somewhat larger and more vertically-disposed lever G. The plate $e^8$ is, it will be seen, provided with a cam portion $g$, adapted to engage the roll $g'$, carried by the upper end of the lever G, which latter is pivotally mounted at $g^2$. In this way the cam $g$, which is carried by the staple-driver arm E, is adapted to actuate the lever G in one direction when it rises and in an opposite direction when it moves downward and then upward for the purpose of driving the staple. However, with this arrangement the cam $g$, through the medium of the lever G, actuates the two cut-off devices or valves $y'$ and $y^2$, so as to move the staples one at a time upon the rod $y$. As shown, the finger $y^8$ and the lever G are connected by a spring $g^3$, so as to insure the proper normal positions for the different parts which are subject to the tension of such spring. Consequently a staple is delivered to the rod $y$ each time the arm E leaves the position shown in Fig. 3 and moves around to the position necessary for inserting the staple. As illustrated, the arm G is provided at its lower end with an end portion having a slot $g^4$, adapted to engage the pin $g^5$, carried by the sliding yoke or member $g^6$, which latter is adapted to slide back and forth upon the horizontal and parallel rods $g^7$. Upon sleeves carried by the portion $g^6$ a pair of fingers H are mounted and adapted to extend upwardly and bear against each other at a point just below the rod $y$, these fingers being provided, preferably, with sharp edges where they meet or come together at their upper end. Normally these two fingers H are held together by a connecting-spring $h$. Upon the same sleeves or reduced portions of the sliding member $g^6$ there are also mounted a pair of laterally-projecting arms or fingers $h'$, each provided with a tooth $h^2$, adapted to engage a pin $h^3$, carried by its allotted or associate finger H. These horizontally-disposed arms or fingers $h'$ are connected by a spring $h^4$. As shown, the rods $g^7$ are rigidly supported in brackets or supporting portions $h^5$. Between these two brackets and at points at opposite sides of the rod $g^7$ a pair of cams $h^6$ are secured to the opposite walls or side portions of the chamber in which this portion of the mechanism is included within the hollow standard or upright A. A spring $g^8$ tends always to draw the arm G toward the open discharge end of the tube Y. In this way the disengagement of the staple-driving device or mechanism shown in Fig. 3 is accompanied by a retraction of the arm G under the influence of the spring $g^8$ and by the spreading apart of the fingers H. This is due to the fact that the arm G cannot retract the fingers H or move them toward the tube Y without causing the fingers $h'$ to engage the slanting or beveled lower surfaces of the cams $h^6$, thereby rotating the fingers H upon their bearings and causing them to spread apart sufficiently to occupy positions at each side and just a little back of the staple which has been delivered to the rod $y$.

When the staple-driving device has finished its work or function of driving the staple, it then swings around to the position shown in Fig. 3 and in so doing moves the arm or lever G into the position necessary for delivering the next staple to the end of the loop-bar F. It will be seen that the final movement of the fingers H toward the open end of the tube Y causes them to again come together and to meet just behind the staple which has been delivered to the rod $y$, and the reverse movement of the sliding member $g^6$ then causes the fingers $h'$ to ride upwardly upon the upper surfaces of the cams $a^6$, this being possible by reason of the pivotal or hinge-like connections existing between these fingers $h'$ and their respective sharp-edged arms or fingers H. Owing to the teeth $h^2$ and the pin $h^3$ the said fingers $h'$ cannot be swung downwardly without causing a corresponding amount of movement on the part of the staple-fingers H in the manner described. The extent of movement of the different parts is such, it will be seen, that the actutation of the arm or lever G to the position shown in Fig. 3 causes the staple which has been delivered to the rod $y$, and which is there ready and waiting to be taken up by the staple-driving devices, to be delivered onto the end of the loop-bar F. After this the arm E then starts to move in the opposite direction and in so doing causes the staple-guide $e^3$ to pass downwardly at each side of the end portion $f'$ of the loop-bar. In this way the grooved or slotted end portions of the staple-guide are caused to slide downwardly upon the staple, which is resting upon the loop-bar; but by the time the staple is firmly lodged in the said grooves or slots of the staple-guide the cam portion $f^6$ has become disengaged from the roll $f^5$, thereby allowing the spring $f^3$ to retract the loop-bar to its normal position, as shown in dotted lines in Fig. 1, thus allowing the staple-driving device to pass and swing upward to the position necessary for enabling it to insert the staple upwardly through the head or end wall and into the cleat. For this purpose the end of the rest B is preferably formed as shown in Figs. 9 and 10 and as further illustrated in Fig. 1. In this connection it will be remembered that the staple-guide slides over the staple as far as the points of the latter and that consequently the points and the end portions of the staple-guide reach the under surface of the wood at about the same time. The rotation of the shaft D continuing, the arm E moves upward a little farther, and the staple-driver inserts the staple upwardly through the wood; but during this final movement of the arm E, necessary for driving the staples, the said staple-guide does not have any movement, as previously explained.

It will be readily understood that the cams, links, lever, and crank connections can all be so relatively adjusted that the various operations will take place in their proper order or sequence—that is, the different operations can be made to take place in their requisite or necessary order—and, furthermore, the mechanism for feeding and supplying and driving these staples can be changed or varied to suit the requirements of different cases and with respect to various sizes of staples. It will be seen, however, that my invention preferably comprises a staple-driving device adapted to swing downwardly and around and take up the staple which is waiting for it and then adapted to swing back and drive the said staple upwardly through the relatively thin head or end wall 1 and into the cleat 2. Of course the staples can be made by the machine itself—that is, can be made from wire in the usual and well-known manner—and then fed to the tube or collar Y; but this is a feature which will not require any illustration or further description. Also, as previously explained, the fastening devices may be either staples, nails, tacks, or other suitable devices, although the staples may perhaps be found desirable and satisfactory, owing to the cheapness of the wire from which they are made and the comparatively simple nature of any devices which may be employed for making and driving the staples.

With this construction the box can be placed upon the arm or rest in the usual manner or on some suitable support and thereon manipulated for the purpose of securing the heads or end walls to the cleats constituting a part of the wire-bound blank. As stated, however, the staples are driven in such manner as to secure a relatively thin material to a relatively thick material, thereby permitting a much more effective and much more natural method of securing the parts together, and, as previously stated, the driving of the staples from thin material into thick material makes it possible to use shorter staples or other fastening devices as well as to insure a more effective lodgment or driving of the same into the wood or other material.

My improved stapling-machine is designed more particularly for use in connection with the manufacture of wire-bound boxes, but can of course be employed for any and all purposes for which it may be found applicable or useful.

With further respect to the vibratory movements of the arm F—that is, the loop-bar—it will be seen that the movement of this arm or loop-bar is limited in one direction by the pin or stop device $f^7$ or by any other suitable or desired means.

It will be seen that the driving means is adapted to swing or vibrate between the two widely-disassociated points of supply and insertion and to move bodily from one point to the other, whereby it can reach into the interior of a box and drive the staples at points close to the side walls of the same. By swinging or vibrating bodily between the said points of supply and insertion I mean that the driving means is adapted to receive a staple and then disconnect itself entirely from the operative feed mechanism or supplying means and then move unrestricted and by itself to the point of insertion, the driving means thus being entirely disconnected and widely separated from the feed mechanism or supplying means at the time that the staple is actually driven or inserted.

It will be seen that the point of supply is so remote from the point of insertion that the feed mechanism or staple-supplying means cannot possibly interfere with the manipulation of the box on the machine or with the driving of the staples at points very close to the side walls of the box. In other words, it is by positioning the staple feeding or supplying means at a point so decidedly out of line with the direction of insertion and so usefully remote from the point of insertion that I am enabled to feed and operatively supply the fastening devices and at the same time drive these fastening devices at points very close to the side walls of the box, for the driving means by itself can when entirely disconnected from all of the feeding mechanism reach into the interior of the box and drive very close to the side wall of the same, inserting the staple upwardly through the end wall and the cleat secured to such side wall of the box.

It will also be seen as a more specific feature of my invention that the combination of the upwardly-swinging staple-driver and the operative feeding or supplying of the fastening devices constitutes a novel and advantageous feature of my invention.

The rest or support B has its end adapted to reach into the box and engage the sides thereof to guide and regulate the movements of the box while the same is being shifted about to receive the staples. The swinging stapler or fastener-driver is also adapted to reach into the box.

What I claim as my invention is—

1. A machine for inserting fastening devices, comprising operative means for supplying fastening devices, a rest for the materials to be fastened together, and means located under the rest adapted for driving or inserting the fastening devices upwardly through the said materials while the latter are suitably held upon said rest, the said driving means being considerably shorter than the distance between the points of supply and insertion, which point of supply is out of line with the direction of insertion.

2. A machine for inserting fastening devices, comprising operative means for supplying fastening devices, means for holding the work, and means for inserting the fastening devices upwardly through the work, together with an upper device for holding the work down while the fastening devices are being driven, the said driving means being considerably shorter than the distance between the points of supply and insertion, which point of supply is out of line with the direction of insertion.

3. A machine for inserting fastening devices, comprising operative means for supplying fastening devices, a rest for the materials to be fastened together, an upper device for holding the materials down upon said rest while the fastening devices are being inserted, and driving means provided with means for picking up a fastening device, and means for causing said driving means to move down to pick up a fastening device and then move back and drive the same upwardly and into the materials supported upon the said rest, the said driving means being considerably shorter than the distance between the points of supply and insertion, which point of supply is out of line with the direction of insertion.

4. A machine for inserting fastening devices, comprising a rest for the materials to be fastened together, a clamping-arm adapted to bear down upon the materials and hold the same in place upon the said rest, staple feeding and delivering mechanism, a staple-driving device, together with means for causing said staple-driving device to pick up a staple from the staple-feeding mechanism and then drive the same upwardly through the materials supported or held upon said rest, the said driving means being considerably shorter than the distance between the points of supply and insertion, which point of supply is out of line with the direction of insertion.

5. A machine for inserting fastening devices, comprising a rest for the materials to be fastened together, means for holding the materials down upon the said rest, staple feeding and delivering mechanism, a staple-driving device, a swinging arm upon which the said staple-driving device is mounted, and means for operating the said elements and causing the said staple-driving device to receive a staple from the said mechanism and carry the same around and drive it upwardly through the materials supported upon the said rest, the said driving means being considerably shorter than the distance between the points of supply and insertion, which point of supply is out of line with the direction of insertion.

6. A machine for inserting fastening devices, comprising operative means for supplying fastening devices, an arm upon which the materials can be placed, means for holding the materials down in place upon said arm, and a staple-driver adapted and operative to drive staples upwardly through the said materials at a point at or adjacent to the end of said arm, the said driving means being considerably shorter than the distance between the points of supply and insertion, which point of supply is out of line with the direction of insertion.

7. A machine for inserting fastening devices, comprising operative means for supplying fastening devices, a horizontally-disposed and laterally-projecting arm having an end portion whereon a box or receptacle may be manipulated for the purpose of securing its parts together, a clamping device for bearing down upon the said box and holding the same against movement during the driving of the fastening devices, and a driving device adapted to work within the interior of the said box or package, and adapted to drive fastening devices upwardly at a point at or near the end of said arm, the said driving means being considerably shorter than the distance between the points of supply and insertion, which point of supply is out of line with the direction of insertion.

8. A machine for inserting fastening devices, comprising operative means for supplying fastening devices, means for supporting a box having sides and a bottom and end walls, and means for securing the said end walls in place, said means including a driving device of a character to extend and operate within the interior of said box, and to thereby drive the fastening devices outwardly through the said end walls, the said driving means being considerably shorter than the distance between the points of supply and insertion, which point of supply is out of line with the direction of insertion.

9. A machine for inserting fastening devices, comprising operative means for supplying fastening devices, a rest for the materials to be fastened together, and devices for inserting the fastening devices upwardly through the said materials while the latter are suitably held upon said rest, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

10. A machine for inserting fastening devices, comprising means for holding the work, and means for inserting the fastening devices upwardly through the work, together with an upper device for holding the work down while the fastening devices are being driven, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

11. A machine for inserting fastening devices, comprising operative means for supplying fastening devices, a rest for the materials to be fastened together, an upper device for holding the materials down upon said rest while the fastening devices are being inserted, and a driving device adapted and operative to move down and pick up a fastening device and then move back and drive the same upwardly and into the materials supported upon the said rest, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

12. A machine for inserting fastening devices, comprising a rest for the materials to be fastened together, a clamping-arm adapted to bear down upon the materials and hold the same in place upon the said rest, staple feeding and delivering mechanism, a staple-driving device, together with means for causing said staple-driving device to pick up a staple from the staple-feeding mechanism and then drive the same upwardly through the materials supported or held upon said rest, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

13. A machine for inserting fastening devices, comprising a rest for the materials to be fastened together, means for holding the materials down upon the said rest, staple feeding and delivering mechanism, a staple-driving device, a swinging arm upon which the said staple-driving device is mounted, and means for operating the said elements and causing the said staple-driving device to receive a staple from the said mechanism and carry the same around and drive it upwardly through the materials supported upon the said rest, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

14. A machine for inserting fastening devices, comprising an arm upon which the materials can be placed, means for holding the materials down in place upon said arm, and a staple-driver adapted and operative to drive staples upwardly through the said materials at a point at or adjacent to the end of said arm, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

15. A machine for inserting fastening devices, comprising operative means for supplying fastening devices, a horizontally-disposed and laterally-projecting arm having an end portion whereon a box or receptacle may be manipulated for the purpose of securing its parts together, a clamping device for bearing down upon the said box and holding the same against movement during the driving of the fastening devices, and a driving device adapted to work within the interior of the said box or package, and adapted to drive fastening devices upwardly at a point at or near the end of said arm, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

16. A machine for inserting fastening devices, comprising operative means for supplying fastening devices, means for supporting a box having sides and a bottom and end walls, and means for securing the said end walls in place, said means including a driving device of a character to extend and operate within the interior of said box, and to thereby drive the fastening devices outwardly through the said end walls, and the said machine comprising means whereby one of a number of fastening devices is automatically released and placed in readiness for delivery to the means for driving the fastening devices, and means for causing the said driving means to swing down and forward and then up in moving from the point of supply to the point of insertion.

17. A machine for inserting fastening devices, comprising operative means for supplying fastening devices, a rest for the materials to be fastened together, and mechanism for inserting the fastening devices upwardly through the said materials while the latter are suitably held upon said rest, the said machine comprising suitable means whereby a number of ready-made fastening devices are released one by one, and whereby each released fastening device is subsequently delivered to the mechanism for driving the fastening devices, the said driving mechanism pivoted to swing about an axis located in a horizontal plane below the point of insertion, and midway between the point of supply and the point of insertion of the fastening devices.

18. A machine for inserting fastening devices, comprising operative means for supplying fastening devices, means for holding the work, and means for inserting the fastening devices upwardly through the work, together with an upper device for holding the work down while the fastening devices are being driven, and the said machine comprising suitable means whereby a number of ready-made fastening devices are released one by one, and whereby each released fastening device is subsequently delivered to the means for driving the fastening devices, the said driving means pivoted to swing about an axis located in a horizontal plane below the point of insertion, and midway between the point of supply and the point of insertion of the fastening devices.

19. A machine for inserting fastening devices, comprising operative means for supplying fastening devices a rest for the materials to be fastened together, an upper device for holding the materials down upon said rest while the fastening devices are being inserted, and a driving device adapted and operative to move down and pick up a fastening device and then move back and drive the same upwardly and into the materials supported upon the said rest, the said machine comprising suitable means whereby a number of ready-made fastening devices are released one by one, and whereby each released fastening device is subsequently delivered to the means for driving the fastening devices, the said driving means pivoted to swing about an axis located in a horizontal plane below the point of insertion, and midway between the point of supply and the point of insertion of the fastening devices.

20. A machine for inserting fastening devices, comprising a rest for the materials to be fastened together, a clamping-arm adapted to bear down upon the materials and hold the same in place upon the said rest, staple feeding and delivering mechanism, a staple-driving device, together with means for causing said staple-driving device to pick up a staple from the staple-feeding mechanism and then drive the same upwardly through the materials supported or held upon said rest, the said machine comprising suitable means whereby a number of ready-made fastening devices are released one by one, and whereby each released fastening device is subsequently delivered to the means for driving the fastening devices, the said driving means pivoted to swing about an axis located in a horizontal plane below the point of insertion, and midway between the point of supply and the point of insertion of the fastening devices.

21. A machine for inserting fastening devices, comprising a rest for the materials to be fastened together, means for holding the materials down upon the said rest, staple feeding and delivering mechanism, a staple-driving device, a swinging arm upon which the said staple-driving device is mounted, and means for operating the said elements and causing the said staple-driving device to receive a staple from the said mechanism and carry the same around and drive it upwardly through the materials supported upon the said rest, the said machine comprising suitable means whereby a number of ready-made fastening devices are released one by one, and whereby each released fastening device is subsequently delivered to the means for driving the fastening devices, the said driving means pivoted to swing about an axis located in a horizontal plane below the point of insertion, and midway between the point of supply and the point of insertion of the fastening devices.

22. A machine for inserting fastening devices, comprising operative means for supplying fastening devices, an arm upon which the materials can be placed, means for holding the materials down in place upon said arm, and a staple-driver adapted and operative to drive staples upwardly through the said materials at a point at or adjacent to the end of said arm, and the said machine comprising suitable means whereby a number of ready-made staples are released one by one, and whereby each released staple is subsequently delivered to the means for driving the staples, the said driving means pivoted to swing about an axis located in a horizontal plane below the point of insertion, and midway between the point of supply and the point of insertion of the fastening devices.

23. A machine for inserting fastening devices, comprising operative means for supplying fastening devices, a horizontally-disposed and laterally-projecting arm having an end portion whereon a box or receptacle may be manipulated for the purpose of securing its parts together, a clamping device for bearing down upon the said box and holding the same against movement during the driving of the fastening devices, and a driving device adapted to work within the interior of the said box or package, and adapted to drive fastening devices upwardly at a point at or near the end of said arm, the said machine comprising suitable means whereby a number of ready-made fastening devices are released one by one, and whereby each released fastening device is subsequently delivered to the means for driving the fastening devices, the said driving means pivoted to swing about an axis located in a horizontal plane below the point of insertion, and midway between the point of supply and the point of insertion of the fastening devices.

24. A machine for inserting fastening devices, comprising operative means for supplying fastening devices means for supporting a box having sides and a bottom and end walls, and means for securing the said end adapted to be inserted within the box-walls in place, said means including a driving device of a character to extend and operate within the interior of said box, and to thereby drive the fastening devices outwardly through the said end walls, and the said machine comprising suitable means whereby a number of ready-made fastening devices are released one by one, and whereby each released fastening device is subsequently delivered to the means for driving the fastening devices, the said driving means pivoted to swing about an axis located in a horizontal plane below the point of insertion, and midway between the point of supply and the point of insertion of the fastening devices.

25. A machine for inserting fastening devices, comprising a rest for the materials to be fastened together, and devices for inserting the fastening devices upwardly through the said materials while the latter are suitably held upon said rest, the said machine comprising means whereby ready-made staples are released one by one, and driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

26. A machine for inserting fastening devices, comprising means for holding the work, and means for inserting the fastening devices upwardly through the work, together with an upper device for holding the work down while the fastening devices are being driven, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

27. A machine for inserting fastening devices, comprising a rest for the materials to be fastened together, an upper device for holding the materials down upon said rest while the fastening devices are being inserted, and a driving device adapted and operative to move down and pick up a fastening device and then move back and drive the same upwardly and into the materials supported upon the said rest, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

28. A machine for inserting fastening devices, comprising a rest for the materials to be fastened together, a clamping-arm adapted to bear down upon the materials and hold the same in place upon the said rest, staple feeding and delivering mechanism, a staple-driving device, together with means for causing said staple-driving device to pick up a staple from the staple-feeding mechanism and then drive the same upwardly through the materials supported or held upon said rest, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

29. A machine for inserting fastening devices, comprising a rest for the materials to be fastened together, means for holding the materials down upon the said rest, staple feeding and delivering mechanism, a staple-driving device, a swinging arm upon which the said staple-driving device is mounted, and means for operating the said elements and causing the said staple-driving device to receive a staple from the said mechanism and carry the same around and driving it upwardly through the materials supported upon the said rest, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

30. A machine for inserting fastening devices, comprising an arm upon which the materials can be placed, means for holding the materials down in place upon said arm, and a staple-driver adapted and operative to drive staples upwardly through the said materials at a point at or adjacent to the end of said arm, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

31. A machine for inserting fastening devices, comprising a horizontally-disposed and laterally-projecting arm having an end portion whereon a box or receptacle may be manipulated for the purpose of securing its parts together, a clamping device for bearing down upon the said box and holding the same against movement during the driving of the fastening devices, and a driving device adapted to work within the interior of the said box or package, and adapted to drive fastening devices upwardly at a point at or near the end of said arm, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

32. A machine for inserting fastening devices, comprising means for supporting a box having sides and a bottom and end walls, and means for securing the said end walls in place, said means including a driving device of a character to extend and operate within the interior of said box, and to thereby drive the fastening devices outwardly through the said end walls, the said machine comprising means whereby ready-made staples are released one by one, and the driving means including a staple-guide for picking up a released staple and carrying it to the position necessary for driving, a staple-driver adapted to slide in the staple-guide after the latter strikes the work, and actuating mechanism operative to totally disconnect the staple guide and driver from the staple feeding or supplying means each time a staple is driven.

33. In a machine of the character described, the combination of an upwardly-swinging hammer for driving fastening devices upwardly, and operative means for feeding or supplying the fastening devices to said hammer.

34. In a machine of the character described, a staple-driver mounted to vibrate between widely-disassociated points of supply and insertion, operative means for feeding or supplying staples to the said driver, means for entirely disconnecting the driver from the said feeding or supplying means and moving it to the point of insertion, in a curve path of back-and-forth travel, and a stationary guide, both the guide and the fastener-driver adapted to enter the interior of a box, substantially as and for the purpose set forth.

35. In a machine of the character described, the combination of means for suitably supplying fastening devices, and a driving device, operating means for entirely disconnecting the driving device from the said feeding or supplying means, and a stationary guide, both the guide and the fastener-driver adapted to enter the interior of a box, substantially as and for the purpose set forth.

36. In a machine for securing the ends of boxes in place, the combination of a combined support and guide adapted to project into the box to support the same and engage the side walls thereof, a clamp for holding the box, operative means for supplying fasteners and a fastener-driver adapted to enter the box, said guide adapted to permit lateral shift of the box thereon.

37. In a machine for securing the ends of boxes in place, the combination of a guide adapted to project into the box and engage the side walls thereof, operative means for supplying fasteners, and a fastener-driver also adapted to reach into the box, said guide adapted to permit lateral shift of the box thereon.

38. In a machine of the class specified, a guide a fastener-driver adapted to swing down and forward and up, operative means for supplying fasteners, and means for so operating the driver, said guide adapted to permit lateral shift of the box thereon.

39. In a machine of the class specified, a horizontal guide-arm adapted to project into a box and engage the side walls thereof, operative means for supplying fasteners, and a swinging fastener-driver adapted to reach into the box, said guide adapted to permit lateral shift of the box thereon.

40. In a box-heading machine, the combination of a guide adapted to project into the box to engage the side walls thereof, a clamp to hold the box in place, operative means for supplying fasteners and a swinging stapler adapted to reach into the box, said guide adapted to permit lateral shift of the box thereon.

41. In a box-heading machine, the combination of a guide adapted to project into the box to engage the sides thereof, means for holding the box in place, means for supplying staples and a swinging staple carrier and driver adapted to reach into the box, said guide adapted to permit lateral shift of the box thereon.

42. A box-heading machine provided with guiding means adapted to reach into the box and engage the sides thereof, operative means for supplying fasteners and fastener-driving means also adapted to reach into the box, whereby the fasteners are driven outwardly from within the box, said guide adapted to permit lateral shift of the box thereon.

Signed by me at St. Joseph, Michigan, this 25th day of May, 1905.

JULIUS J. MILLER.

Witnesses:
JOHN V. STARR,
FRANK BRACELIN.